Figure 1:
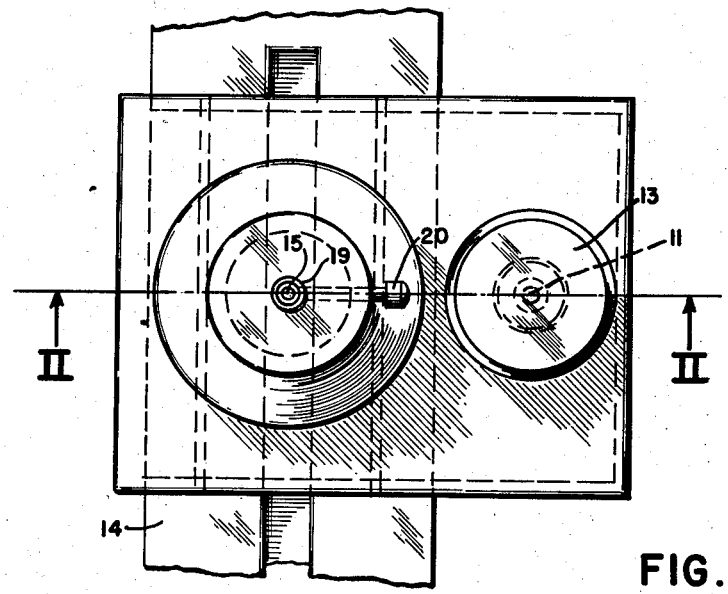

June 10, 1958 N. MARCUVITZ 2,838,670
RESONANT CAVITY TYPE WAVE GUIDE PROBE
Filed March 29, 1946

INVENTOR
NATHAN MARCUVITZ
BY
ATTORNEY

United States Patent Office

2,838,670
Patented June 10, 1958

2,838,670
RESONANT CAVITY TYPE WAVE GUIDE PROBE

Nathan Marcuvitz, Boston, Mass., assignor, by mesne assignments, to the United States of America as represented by the Secretary of the Navy Application March 29, 1946, Serial No. 657,995

8 Claims. (Cl. 250—31)

This invention relates to wave guide probes, and more particularly to an improved type of probe for measuring standing wave ratios and wave lengths in wave guides with a minimum loss of energy in the guide.

The measurement of standing wave ratios in wave guides is generally accomplished by the use of a metal probe inserted into the wave guide through a narrow slot. The probe is so located as to be in the plane of the electric intensity vectors in the guide. Thus the magnitude of radio frequency voltage induced in the probe is an indication of the electric field strength at that point. By means of a suitable detector the radio frequency energy may be converted to direct current energy and the energy value of the rectified current indicated by a microammeter.

If the slot in the wave guide is of a length corresponding to one or more wave lengths of the radio frequency in the wave guide, it is possible by moving the probe in the slot to locate points of maximum and minimum electric intensity in the guide. The ratio of the direct current output at these points of maxima and minima is the standing wave ratio in the guide.

The usual method of coupling a crystal detector into a wave guide probe is to insert the crystal in the center conductor of a coaxial line in series with the probe. The impedance of the crystal detector is generally much different from the characteristic impedance of the coaxial line. As a result the system is quite frequency sensitive and considerable energy is lost due to reflections resulting from mismatch between the probe and the crystal.

The present invention is intended to provide a detecting means that has low frequency sensitivity and low losses. In other words, a probe is provided that has a lower Q, or quality factor, than the conventional waveguide probe. This invention provides a means of energizing the crystal detector by mounting the detector in a wave guide section, which is of the size commonly used for frequencies at which the measurements are made. A wave guide section was chosen because its characteristic impedance is very nearly that of the crystal detector used at frequencies for which this equipment was initially designed. With suitable coupling and tuning devices it is then possible to obtain a much better impedance match between the crystal and pick-up probe than is possible with the crystal inserted in the coaxial line. The resulting reduction in losses provides higher sensitivity for a given probe insertion depth.

A primary object of the present invention is to provide a low Q, low loss, wave guide probe for the measurement of electric field intensity in wave guides.

Another object of the present invention is to generally improve the accuracy of measurements of electric field strength in wave guides.

A further object of the present invention is to provide a means for more accurately measuring standing wave ratios in wave guides.

Figure 2:
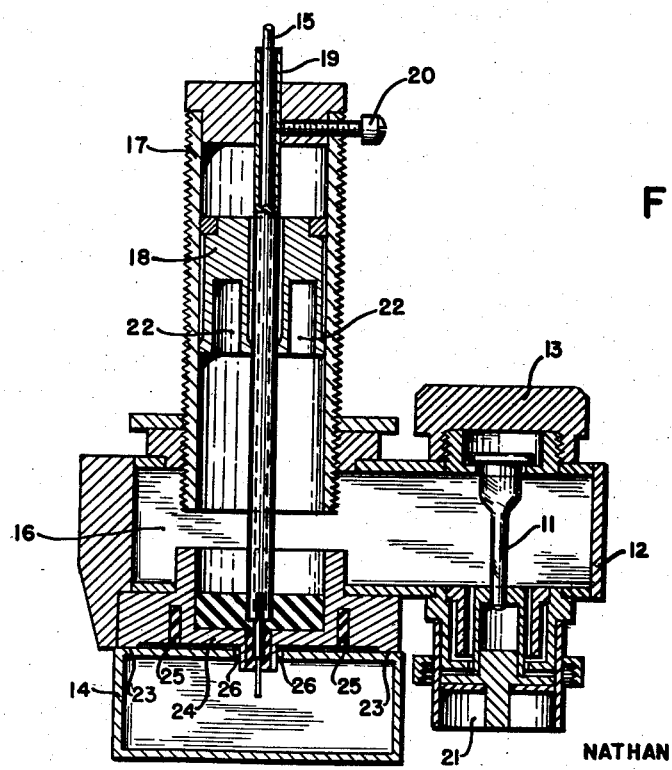

The above and other objects will be apparent from the following specification when taken with the accompanying drawings in which:

Fig. 1 is a top view of one embodiment of the invention shown in position on its associated wave guide; and Fig. 2 is a cross sectional illustration of the embodiment of Fig. 1, taken on section II—II.

The parts reference numbers used in Fig. 1 are the same as the numbers used for corresponding parts in Fig. 2.

In the drawings, and more particularly in Fig. 2, crystal 11 is mounted in wave guide section 12 approximately one-quarter wave length from the end. Cap 13 is provided to facilitate changing crystals. Power from wave guide 14 being investigated is picked up by probe 15, the amount of coupling depending upon the insertion depth of probe 15 into wave guide 14. To vary the amount of coupling between probe 15 and the cavity 16 formed by wave guide section 12, threaded cylinder 17 can be raised or lowered. Further tuning is possible with metal plunger 18 which can be moved up and down by means of metal sleeve 19 which slides on the outside of probe 15. Plunger 18 can be locked in place by suitable means, such as set screw 20. By proper adjustment of the positions of threaded cylinder 17 and metal plunger 18 with respect to the bottom of wave guide section 12, crystal detector 11 is matched to probe 15 and maximum energy is transferred from investigated wave guide 14 to the crystal detector 11. The direct current output of crystal detector 11 is taken through the coaxial coupling 21.

Plunger 18 has a circular groove 22 one-quarter wave length deep cut into its surface to make the radio frequency current approach zero at the point of contact of plunger 18 and cylinder 17. If this were not done, the radio frequency current flow between these points of contact would produce potentials at these points and lead to erratic contact.

To prevent changes in the contact resistance at point 26 between wave guide 14 and the metal support 24 for probe 15, two quarter wave chokes 25 are used. These chokes consist of two longitudinal slots cut in metal support 24, filled with polystyrene dielectric to reduce the physical depth required to produce an electrical depth of one-quarter wave length. The total electrical distance from points 26 to the respective quarter wave slots 25 is one-quarter wave length. Therefore, the short circuit at the bottom of slot 25 appears at point 26 as a radio frequency short circuit. Thus a good electrical contact exists at all times between wave guide 14 and probe support 24, regardless of the variable contact that may exist as the probe is moved along wave guide 14. To prevent contact between support 24 and wave guide 14 at the slot, point 26, the entire assembly can be guided by machined ways to keep it centered on guide 14.

Fig. 1 is a top view of the embodiment of Fig. 2 showing how the probe assembly is mounted on the main wave guide 14 when making measurements of electric field intensity.

The invention described in the foregoing specification need not be limited to the details shown, which are considered to be illustrative of one form the invention may take.

What is claimed is:

1. In combination, a rectangular wave guide section having a longitudinal slot in a broad wall thereof, a carriage mounted for longitudinal movement along said broad wall, a cavity resonator secured to said carriage, a probe supported in energy transferring relation with said resonator and inserted into said guide through said slot, means for varying the insertion of said probe into said wave guide, means positioned in said resonator for detecting the energy picked up by said probe, and a retractable cylinder extending into said resonator and partially enclosing said probe for impedance matching of said probe and said detecting means.

2. In combination, a rectangular wave guide section having an axial slot in a broad wall thereof, a carriage having a tongue inserted into said slot mounted for movement along said wave guide, a cavity resonator mounted on said carriage, a probe supported in energy transferring relation with said resonator and passing through said tongue into said wave guide, a crystal detector positioned in said resonator for detecting energy picked up by said probe, a retractable cylinder mounted coaxially and partially enclosing said probe for impedance matching said probe to said detector, and means associated with said carriage for insuring good electrical contact between said tongue and the sides of said slot as said carriage is moved along said wave guide.

3. Apparatus in accordance with claim 2 including means for varying the depth of insertion of said probe into said wave guide.

4. Apparatus in accordance with claim 3 including means disposed in the annular space between said probe and said cylinder for tuning said resonator.

5. In combination a rectangular wave guide section having a longitudinal slot in a broad wall thereof, a cavity resonator, a cylindrical member mounted on one of the end walls of said resonator and an aperture cut in the other end wall of said resonator, said cavity resonator being mounted for movement along said broad wall with said aperture cooperating with said slot, a probe supported concentrically within said cylinder extending through said aperture and slot into said wave guide section, means for inserting said cylindrical member into said cavity resonator for a variable distance whereby the amount of coupling between said probe and said resonator is adjusted, a crystal detector positioned within said resonator, and a plunger slidably mounted on said probe for tuning said probe to said rectangular wave guide section.

6. In combination a rectangular wave guide section having longitudinal slot in a broad wall thereof, a cavity resonator, a first tubular member mounted on one end wall of said resonator and extending into said resonator for a predetermined distance and a second tubular member coaxially mounted on the other end wall of said resonator, an aperture cut in said second end wall, said resonator being mounted for movement along said broad wall with said aperture cooperating with said longitudinal slot, a probe supported concentrically within said tubular members extending through said aperture and said slot into said rectangular wave guide sections thereby coupling electromagnetic energy from said section into said resonator, means for changing the distance said first tubular member extends into said cavity resonator whereby the degree of coupling between said probe and said cavity resonator is altered, a crystal detector positioned within said cavity resonator and a conductive plunger slidably mounted on said probe and contacting the inner wall of said first tubular member for tuning said probe to said rectangular wave guide section.

7. Apparatus in accordance with claim 6 including means for varying the depth of insertion of said probe into said rectangular wave guide section.

8. Apparatus in accordance with claim 6 wherein said crystal detector is located approximately one-quarter wave length of the operating frequency of said resonator from the side wall of said cavity resonator.

References Cited in the file of this patent

UNITED STATES PATENTS

| | | |
|---|---|---|
| 2,106,713 | Bowen | Feb. 1, 1938 |
| 2,404,797 | Hansen | July 30, 1946 |
| 2,408,032 | Beck | Sept. 24, 1946 |
| 2,419,208 | Frantz | Apr. 22, 1947 |
| 2,423,506 | Landon | July 8, 1947 |
| 2,454,042 | Dettinger | Nov. 16, 1948 |
| 2,488,378 | Coltman | Nov. 15, 1949 |
| 2,530,248 | Larson | Nov. 14, 1950 |